(12) United States Patent
Okubo

(10) Patent No.: US 6,449,427 B1
(45) Date of Patent: Sep. 10, 2002

(54) LOADING DRIVE SYSTEM

(75) Inventor: Toshiro Okubo, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 29 days.

(21) Appl. No.: 09/705,477

(22) Filed: Nov. 2, 2000

(30) Foreign Application Priority Data

Nov. 5, 1999 (JP) .......................................... 11-314812

(51) Int. Cl.$^7$ ............................. H02P 7/06; G11B 19/00
(52) U.S. Cl. ....................................... 388/830; 318/500
(58) Field of Search ........................... 318/4, 244, 245, 318/256, 257, 268, 280, 500; 388/825, 828, 830, 908

(56) References Cited

U.S. PATENT DOCUMENTS 3,742,328 A * 6/1973 Ohta ........................... 318/685
5,977,755 A * 11/1999 Miki et al. .................. 323/269
6,064,187 A * 5/2000 Redl et al. ................... 323/285

* cited by examiner

Primary Examiner—Bentsu Ro
(74) Attorney, Agent, or Firm—Hogan & Hartson, LLP

(57) ABSTRACT

Upon receipt of a reference voltage signal Vi and a multiplicity of logic control signals L1 and L2, the loading drive system converts the signals received into a first control voltage Vi1 and a second control voltage Vi2 in such that the voltage difference between the two logic control signals L1 and L2 represents the reference voltage signal, and the polarity of the difference represents the logic control signals. When the first and the second control voltages Vi1 and Vi2 are below a predetermined level, the one lower than the predetermined level is converted to zero Volt, and then the differences Vi1−Vi2 and Vi2−Vi1 are formed to define a first and a second output voltages, Vo1 and Vo2, respectively. Thus, the logic control signals and the reference voltage signal can be supplied from the controller to the loading driver by a fewer number of signal lines, and so are input and output terminals or pins associated with the signals.

16 Claims, 3 Drawing Sheets

LOADING DRIVE SYSTEM

FIELD OF THE INVENTION

The invention relates to a loading drive system for loading or unloading a disk such as a CD on a disk player.

BACKGROUND OF THE INVENTION

A loading drive system for a disk driver for CDs, CD-ROMs, and MDs uses a loading motor driven by a loading driver, which is adapted to receive:

a logic control signal for switching the operation of the motor from one mode to another among forward, reverse, and stop modes;

and a reference voltage for setting an output voltage of the loading driver.

FIG. 1 shows such a conventional loading drive system. A controller 11 shown in FIG. 1 has a microcomputer to generate, at the output terminals PC1–PC3 thereof, logic control signals L1 and L2, to generate a forward, a reverse and a stop signals, and a reference voltage signal Vi for setting the output voltages to be supplied to a loading motor. A loading driver 12 receives, at the input terminals PL1–PL3 thereof, the logic control signals L1 and L2, and the reference voltage signal Vi, to generate at the output terminals PL4 and PL5 thereof, drive voltages Vo1 and Vo2 for the loading motor 13, based on the logic control signals L1 and L2 and the reference voltage signal Vi.

In this example, the reference voltage Vi is supplied from the output terminal PC1 of the controller 11 to the input terminal PL1 of the loading driver 12. At the same time, the logic control signals L1 and L2 are supplied from the output terminals PC2 and PC3 of the controller 11 to the input terminals PL2 and PL3 of the loading driver 12. The logic control signals L1 and L2 together define a forward, a reverse, and a stop signal for the loading motor 3, in terms of combinations of their HIGH and LOW levels of the logic control signals, which are for example HIGH-LOW, LOW-HIGH, and LOW-LOW.

The loading driver 12 determines, from the logical status of the logic control signals L1 and L2 and the level of the reference voltage signal Vi, the value and the polarity of the output voltage to be supplied to the loading motor 13 and generates appropriate output voltages Vo1 and Vo2 at the output terminals PL4 and PL5 thereof, based on the value and the polarity. The loading motor 13 is driven by the output voltages Vo1 and Vo2 of the loading driver.

Thus, a conventional loading drive system requires two signal lines for supplying the loading driver 12 with logic control signals L1 and L2 for establishing a forward, a reverse, and a stop mode signal, and another line for supplying a reference voltage signal Vi, hence requiring three lines in total for setting up the output voltage for the motor. The loading drive system also requires a corresponding number of input and output terminals.

SUMMARY OF THE INVENTION

It is therefore an object of the invention to provide a loading drive system having a fewer signal lines, and hence a fewer output and input terminals, or pins, for supplying logic control signals along with a reference voltage signal from a controller to a loading driver.

A loading drive system according to the invention comprises:

a control section 21 which converts a given reference voltage signal Vi and a multiplicity of logic control signals (e.g. two logic signals L1 and L2) to a first control voltage Vi1 and a second control voltage Vi2 such that the difference between said first and second control voltages Vi1 and Vi2, respectively, represents said reference voltage Vi and the polarity (including nullity) of said difference represents combinations of said logic control signals;

a loading driver 23 for performing, upon receipt of said first and second control voltage Vi1 and Vi2, respectively, from said control section 21, operations to generate a first output voltage Vo1 by subtracting said second control voltage Vi2 from said first control voltage Vi1 and a second output voltage Vo2 by subtracting said first control voltage Vi1 from said second control voltage Vi2;

said loading drive system outputting said first and second output voltages Vo1 and Vo2, respectively, of said loading driver as the outputs of the loading drive system.

Thus, the invention may reduce not only the number of signal lines required for supplying the loading driver with logic control signals and a reference voltage signal, but also the corresponding number of input and output terminals or pins, thereby adding a further freedom in the design, and hence facilitating easier design, of a loading driver, under a given limitation on the number of pins.

The loading driver may have a muting circuit which converts the first control voltage Vi1 and/or the second control voltage Vi2 received from the control section 21 to zero volt when the first control voltage Vi1 and/or the second control voltage Vi2 are (is) below a predetermined level.

Thus, when the first and/or the second control voltages Vi1 and Vi2, respectively, are (is) lower than the predetermined level, the muting circuit mutes. That is, the muting circuit converts the first and/or the second voltages to zero volt prior to the operations as described above. This enables canceling out the offset voltages in the first and second control voltages Vi1 and Vi2, i.e. output saturation voltages that remain in the first and second control voltages Vi1 and Vi2, thereby improving the input-output characteristics of the loading drive system and the range of control voltages available to the loading driver.

The loading driver is provided with:

first voltage-current conversion means for converting the first control voltage Vi1 received from the control section 21 into a first current I1';

second voltage-current conversion means for converting the second control voltage Vi2 received from the control section 21 into a second current I2';

first current-voltage conversion means for converting current I1, which is the first current I1' minus the second current I2', into a first voltage; and second current-voltage conversion means for converting current I2, which is the second current I2' minus the first current I1', into a second voltage, to thereby perform the aforementioned operations in terms of the converted currents I1 and I2.

In this arrangement, the aforementioned operations to obtain output voltages Vo1 and Vo2 from the first and the second control voltages Vi1 and Vi2, respectively, received from the control section 21, may be performed easily and correctly.

In another aspect of the invention, a loading drive system comprises:

a control section 21 which converts a reference voltage signal and a multiplicity of logic control signals (e.g.

two logic signals L1 and L2) to a first control voltage Vi1 and a second control voltage Vi2 such that the difference between said first and second voltages Vi1 and Vi2, respectively, represents said reference voltage Vi and the polarity (including nullity) of said difference represents combinations of said logic control signals:

a loading driver 23 for performing, upon receipt of said first and second voltages from said control section, operations to generate an output voltage by subtracting said first voltage from said second voltage or by subtracting said second voltage from said first voltage;

said loading drive system outputting said first and second output voltages of said loading driver as the outputs of the loading drive system.

This loading drive system may also incorporate therein muting circuits, voltage-current conversion means and current-voltage conversion means similar to those described above in connection with the preceding example.

Thus, although the level of the drive output voltage is somewhat reduced, the system advantageously has a simple structure in carrying out the aforementioned operations, and a simple output structure requiring a minimum number of output buffers and output terminals.

DETAILED DESCRIPTION OF THE PREFERRED EMBODIMENT

Figure 1:
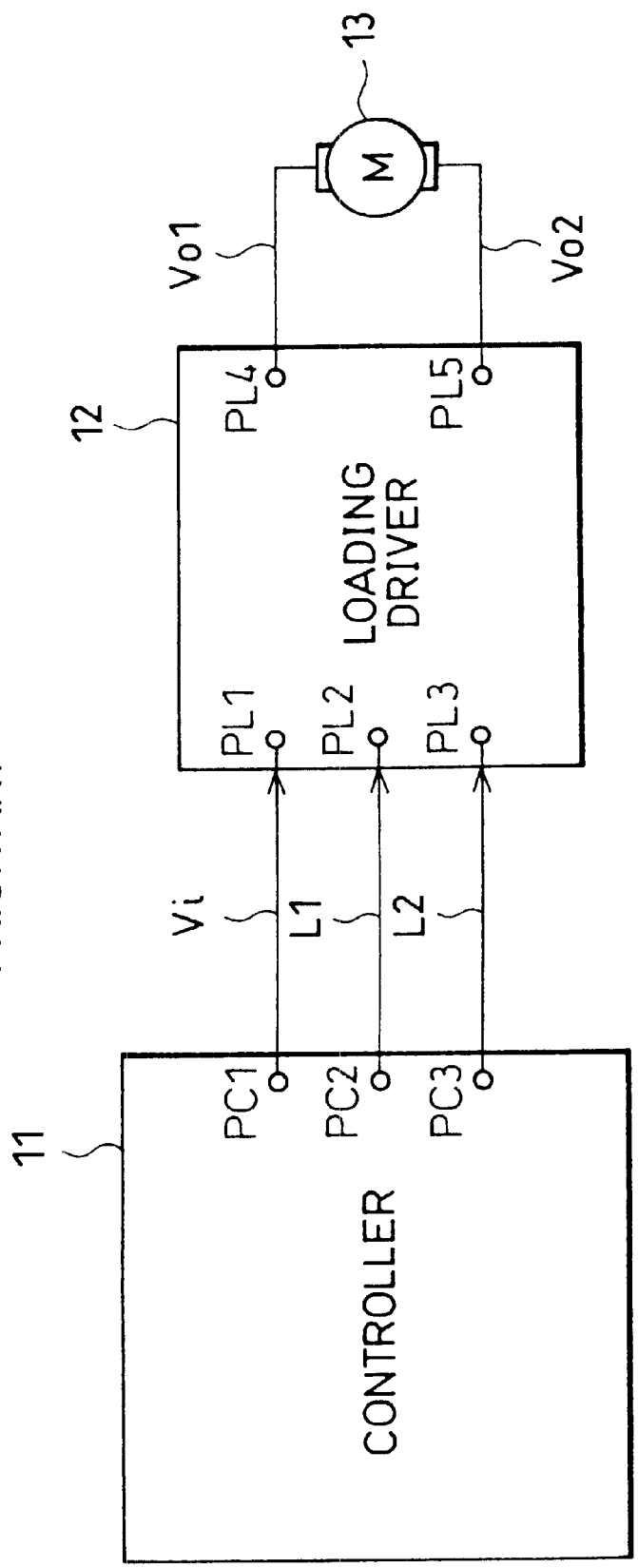
FIG. 1 is a block diagram representation of a conventional loading drive system.
Figure 2:
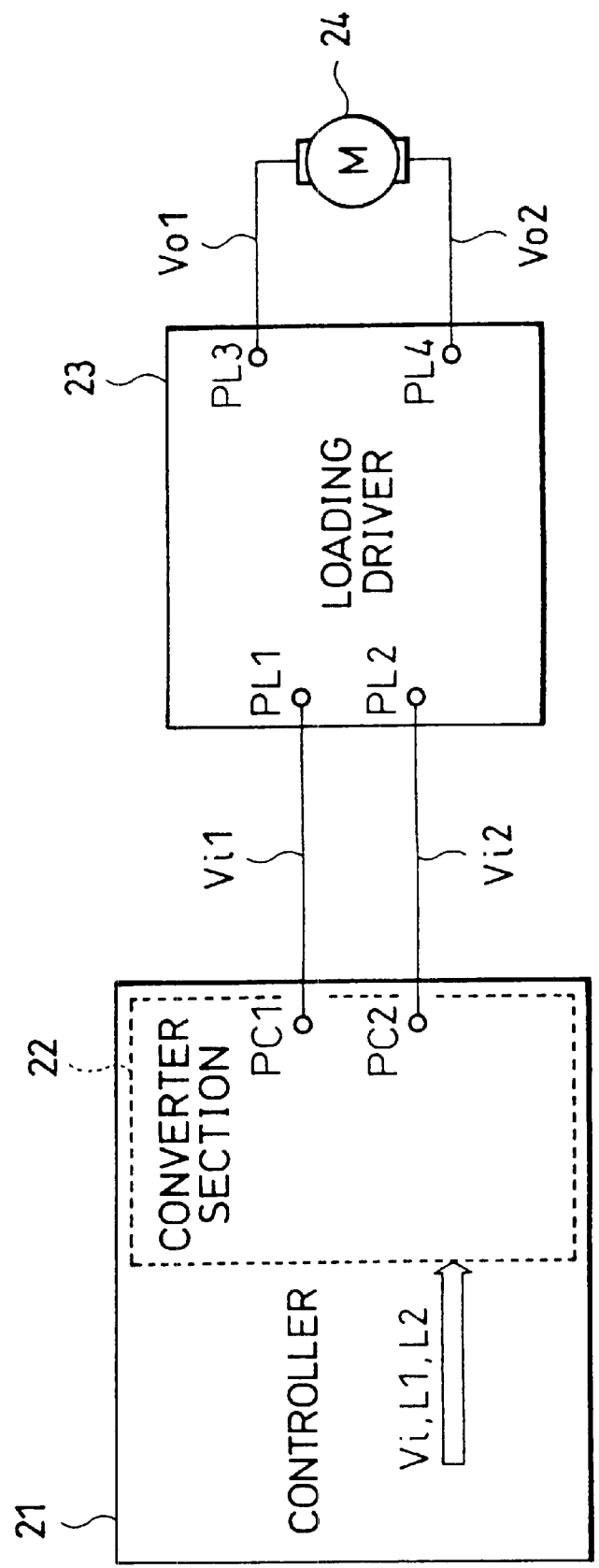
FIG. 2 is a block diagram representation of a loading drive system according to the invention.

As shown in FIG. 2, the loading drive system comprises:

a controller 21 which includes a converter section 22 having two output terminals PC1 and PC2 for outputting a first control voltage Vi1 and a second control voltage Vi2;

and a loading driver 23 having input terminals PL1 and PL2 for receiving respectively the first control voltage Vi1 and the second control voltage Vi2, and output terminals PL3 and PL4 for outputting respectively a first output voltage Vo1 and a second output voltage Vo2 to a loading motor 24.

The controller 21 generates logic control signals L1 and L2 for establishing a forward, a reverse, and a stop signal for driving a loading motor 24 in a forward and a reverse direction or for stopping the loading motor 24, and generates a reference voltage signal Vi for setting the levels of the output voltages. The invention has a feature that the logic control signals L1 and L2 and the reference voltage signal Vi are converted by the converter section 22 into two control signals with reference to a common electric potential, so that the control signals are supplied to the loading driver via two output lines.

As an example, if the logic control signals L1 and L2 may have a HIGH and a LOW voltage level, there can be four combinatory status, HIGH-LOW, LOW-HIGH, LOW-LOW, and HIGH-HIGH. The invention generates a first and a second output control voltages Vi1 and Vi2, respectively, in such a way that the difference between the first and the second control voltages Vi1 and Vi2, respectively, represents the reference voltage Vi, and the polarity (including nullity) of the difference represents different status of the logic control signals L1 and L2.

To this end, the converter section 22 may have a dedicated hardware for carrying out the operations to obtain the required signals Vi1 and Vi2, or alternatively a software for carrying out the operations since the converter section 22 comprises a microcomputer capable of executing out such software.

Figure 3:
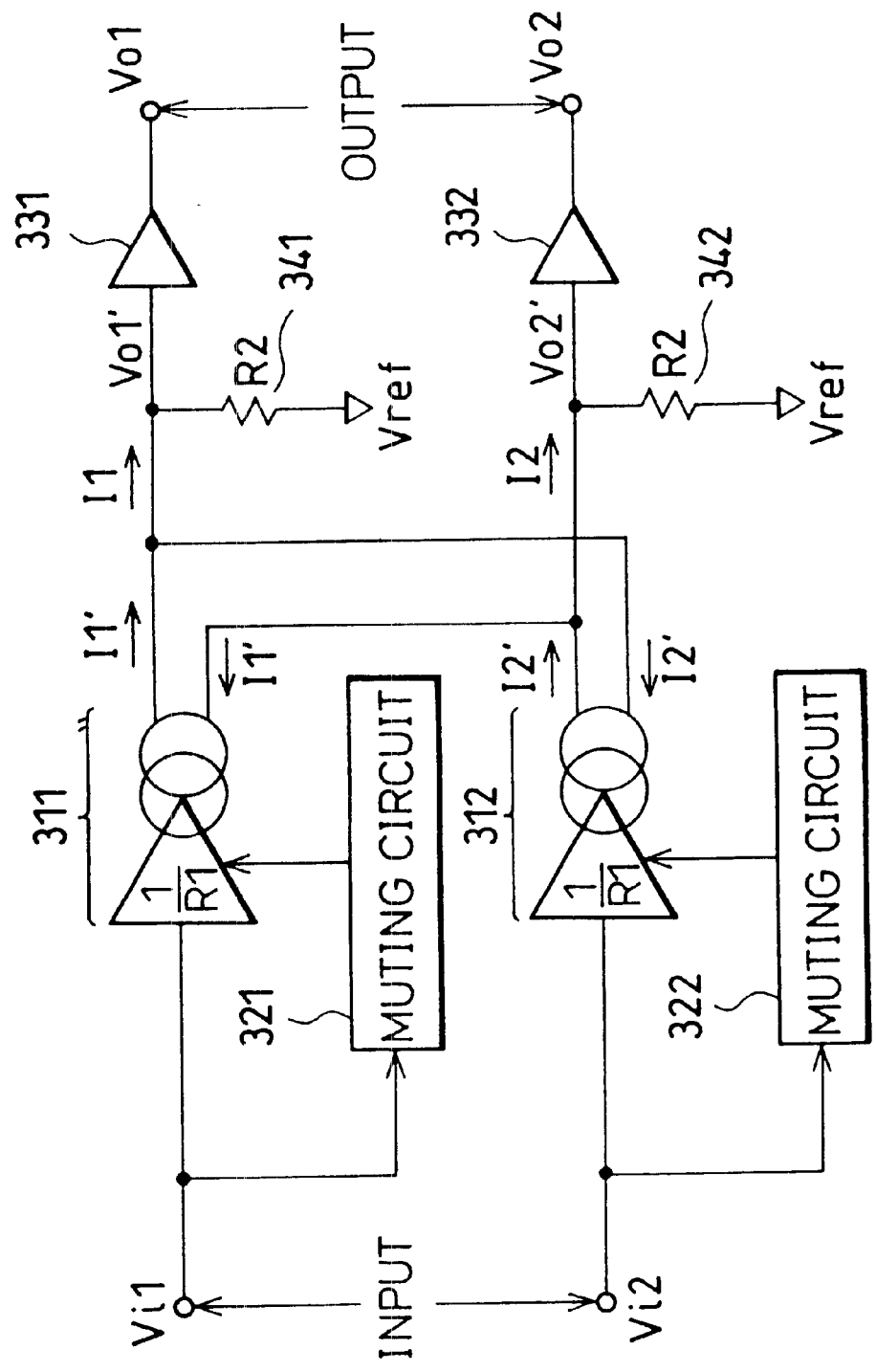
FIG. 3 is a block diagram representation of another loading drive system according to the invention.

The loading driver 23 receives at its input terminals PL1 and PL2 the first and the second control voltages Vi1 and Vi2, respectively, from controller 21, performs prescribed operations, and outputs the first and the second output voltages Vo1 and Vo2, respectively, to the loading motor 24, as shown in FIG. 3.

FIG. 3 shows an arrangement of a loading driver 23 according to the invention.

The first control voltage Vi1 is supplied to a voltage-current conversion circuit 311 and to a first muting circuit 321, as shown in the figure. The voltage-current conversion circuit 311 is adapted to convert a voltage input thereto to an output current I1' which equals in magnitude to the input voltage multiplied by a given factor. In the example shown herein, the output current I1' is given by:

$$I1'=Vi1/R1$$

where Vi1 is the first input voltage, and R1 is the multiplication factor.

The muting circuit 321 performs a muting operation. That is, the muting circuit 321 monitors the magnitude of the first control voltage Vi1 and nullify the output voltage thereof before it is supplied to the voltage-current conversion circuit 311 if the magnitude of the first control voltage Vi1 is lower than a predetermined level (for example, 0.7 Volts, which is well above the output saturation voltage of a switching element of the controller 21 associated with the control voltage Vi1), and supplies the input voltage Vi1 to the voltage-current conversion circuit 311 if the level of the input voltage exceeds the predetermined level.

Similarly, the second control voltage Vi2 is supplied to a voltage-current conversion circuit 312 and to a second muting circuit 322. The second voltage-current conversion circuit 312 is also adapted to convert a voltage input thereto to an output current I2' which equals in magnitude to the input voltage multiplied by a given factor. In the example shown herein, the output current I2' is given by:

$$I2'=Vi2/R1$$

where Vi2 is the second input voltage.

The muting circuit 322 performs a muting operation in which the muting circuit 322 monitors the level of the second control voltage Vi2 and nullify the output voltage thereof before it is supplied to the second voltage-current conversion circuit 312 if the level of the second control voltage Vi2 is lower than a predetermined level (for example, 0.7 Volts), and supplies the input voltage directly to the second voltage-current conversion circuit 312 if the magnitude of the input voltage exceeds the predetermined level.

The first and the second control voltages Vi1 and Vi2, respectively, cannot be set below output saturation voltages of the output switching elements of the converter section 22. However, it is preferable to make large the difference between the first and the second control voltages Vi1 and Vi2, respectively, as much as possible.

In view of this preference, the muting circuits 321 and 322 are adapted to nullify the output voltages if they are below the predetermined level (e.g. 0.7 Volts) which is set above the saturation voltages of the switching elements. Thus, it is possible to make large the difference between the first and the second control voltages Vi1 and Vi2, respectively, by means of the muting circuit 321. It would be apparent that the controller 21 will never issue an instruction to generate the control voltages Vi1 and Vi2 below the predetermined levels.

Thus, a first difference current I1, which is the current output I1' of the voltage-current conversion circuit 311 minus the current output I2' of the second voltage-current conversion circuit 312, is supplied to a reference voltage source Vref via a resistor 341, so that the voltage Vo1' across the resistor 341 is provided via a drive buffer 331 as the first output voltage Vo1.

Similarly, a second difference current I2, which is the current output I2' of the second voltage-current conversion circuit 312 minus the current output I1' of the voltage-current conversion circuit 311, is supplied to the reference voltage source Vref via a resistor 342, so that the voltage Vo2' across the resistor 342 is provided via a drive buffer 332 as the second output voltage Vo2.

If in the loading driver 23 as shown in FIG. 3 the first and the second control voltages Vi1 and Vi2, respectively, input thereto are not greater than the predetermined level of 0.7 Volts, for example, the loading driver 23 mutes the control voltages to zero.

Otherwise, the first and the second control voltages are converted by the voltage-current conversion circuits 311 and 312, respectively, to the output currents I1' and I2' given by:

$$I1'=Vi1/R1$$

$$I2'=Vi2/R1.$$

Derived from these output current I1' and I2' are a first and a second difference currents I1 and I2, respectively, defined by:

$$I1=I1'-I2'$$

$$I2=I2'-I1'.$$

The first and the second difference currents I1 and I2, respectively, are passed through the respective resistors 341 and 342 having the same resistance, to generate the first and the second output voltages Vo1 and Vo2, respectively, which are supplied to the loading motor 24.

What follows is a summary of the formulas used in the operations to obtain the two output voltages Vo1 and Vo2.

$$I1'=Vi1/R1$$

$$I2'=Vi2/R1$$

$$I1=-I2=I1'-I2'$$

$$Vo1'=I1 \cdot R2+Vref$$

$$Vo2'=-I1 \cdot R2+Vref$$

$$Vo1'=Vo1$$

$$Vo2'=Vo2$$

$$Vo1-Vo2=2I1 \cdot R2=2 \cdot (R2/R1) \cdot (Vi1-Vi2).$$

In this way, the current I2' proportional to the second control voltage Vi2 is subtracted from the current I1' proportional to the first control voltage Vi1 to obtain the first current I1 to generate the first output voltage Vo1, while the current I1' proportional to the first control voltage Vi1 is subtracted from the current I2' proportional to the second control voltage Vi2 to obtain the second current I2 (=−I1) to generate a second output voltage Vo2. Thus, the loading motor 24 can be controlled through the difference of the two output voltages Vo1 and Vo2 and the polarity of the difference voltage.

As compared with conventional loading drive systems where an input terminal (reference voltage input terminal) is required for setting an inter-output voltage in addition to logic control terminals, the loading drive system of the invention does not need such additional reference voltage input terminal since the logic control terminals also serve to set the inter-output voltage. This implies that the port for the additional reference voltage in the controller 21 and the corresponding port in the loading driver 23 are not necessary. It is noted that the output voltages Vo1 and Vo2 can be obtained accurately through simple operations on the two control voltages Vi1 and Vi2 received from the controller 21 by calculating the difference in the resultant currents associated with the first and the second control voltages.

In the example shown herein, since the first and the second control voltages Vi1 and Vi2, respectively, provide the reference voltage Vi as the difference between them, they can be advantageously set to give as large a difference as possible to maximize the control voltage for the loading motor. Preferably, one of the control voltages, Vi1 and Vi2, having a lower potential is chosen to be the zero point potential. It should be noted, however, that there could be residual output saturation voltages in the switching elements of the converter section 22, since the converter section 22 of the controller 21 typically consists of integrated circuits including MOSFETs as switching elements. In addition, noises could enter the control voltages Vi1 and Vi2 during the transmission thereof from the controller 21 to the loading driver 23.

In order to eliminate the influences of such residual output saturation voltages and noises, the inventive loading drive system is provided with the first muting circuit 321 for the first control voltage Vi1, and the second muting circuit 322 for the second control voltage Vi2. These muting circuits are adapted to cancel out the output saturation voltages and the noises, to thereby restoring intrinsic electric potentials of the control signals.

Because the muting circuits 321 and 322 cancel out the output saturation voltages and the noises involved in the first and the second control voltages Vi1 and Vi2, respectively, the difference voltage between them, and hence the usable range of the reference voltage Vi, can be made larger as desired.

In the foregoing example, the muting circuit 321 mutes when the control Vi1 is lower than the predetermined level (0.7 Volts in the example shown above) with reference to the zero point potential at 0 Volt, and so does the muting circuit 322 when the control voltage Vi2 is lower than the predetermined level. However, the reference voltage can be set with respect to any other desired zero point potential, for example, the potential Vcc of a power supply. In this latter example, the output voltages are also determined with respect to the potential Vcc.

It will be understood that, since both the first and the second output voltage Vo1 and Vo2, respectively, have a term proportional to ± (R2/R1)·(Vi1−Vi2) which includes the first and the second control voltages Vi1 and Vi2, respectively, either the first output voltage Vo1 or the second output voltage Vo2 can be used as the output voltage to control the loading motor 24 if the constant voltage Vref of the reference voltage source is supplied to the loading motor 24.

In this case, although the output voltage for driving the loading motor 24 can be smaller as compared with that of the preceding example, the arrangement of the loading drive system is much simpler, requiring a fewer output buffers and output terminals.

I claim:

1. A loading drive system comprising:

a control section for converting a set of given reference voltage signal and a multiplicity of logic control signals into a set of first control voltage and a second control voltage such that the difference between said first and second control voltages represents said reference voltage signal and the polarity of said difference represents a combination of said logic control signals;

a loading driver for performing operations, upon receipt of said first and second control voltages from said control section, to generate a first output voltage by subtracting said second control voltage from said first control voltage and a second output voltage by subtracting said first control voltage from said second control voltage; and said loading drive system outputting said first and second output voltages of said loading driver as the outputs of the loading drive system.

2. The loading drive system according to claim 1, wherein said loading driver has:

a first muting circuit which converts said first control voltage received from said control section to zero volt when said first control voltage is below a predetermined level; and a second muting circuit which converts said second control voltage received from said control section to zero volt when said second control voltage is below said predetermined level.

3. The loading drive system according to claim 1, wherein said loading driver is provided with:

first voltage-current conversion means for converting the first control voltage received from the control section into a first current;

second voltage-current conversion means for converting the second control voltage received from the control section into a second current;

first current-voltage conversion means for converting a current which is the first current minus the second current into a first voltage; and second current-voltage conversion means for converting a current which is the second current minus the first current into a second voltage, to thereby perform the aforementioned operations in terms of said converted currents.

4. The loading drive system according to claim 3, wherein said loading driver has:

a first muting circuit which converts said first control voltage received from said control section to zero volt when said first control voltage is below a predetermined level; and a second muting circuit which converts said second control voltage received from said control section to zero volt when said second control voltage is below said predetermined level.

5. A loading drive system comprising:

a control section for converting a set of given reference voltage signal and a multiplicity of logic control signals into a set of first control voltage and a second control voltage such that the difference between said first and second control voltages represents said reference voltage signal and the polarity of said difference represents a combination of said logic control signals;

a loading driver for performing operations, upon receipt of said first and second control voltages from said control section, to generate an output voltage by subtracting said first voltage from said second voltage or by subtracting said second voltage from said first voltage; and said loading drive system outputting said output voltages of said loading driver as the outputs of the loading drive system.

6. The loading drive system according to claim 5, wherein said loading driver has:

a first muting circuit which converts said first control voltage received from said control section to zero volt when said first control voltage is below a predetermined level; and a second muting circuit which converts said second control voltage received from said control section to zero volt when said second control voltage is below said predetermined level.

7. The loading drive system according to claim 5, wherein said loading driver is provided with:

first voltage-current conversion means for converting the first control voltage received from the control section into a first current;

second voltage-current conversion means for converting the second control voltage received from the control section into a second current; and either one of current-voltage conversion means for converting a current which is the first current minus the second current into a first voltage and current-voltage conversion means for converting a current which is the second current minus the first current into a second voltage, to thereby perform the aforementioned operations in terms of said converted currents.

8. The loading drive system according to claim 7, wherein said loading driver has:

a first muting circuit which converts said first control voltage received from said control section to zero volt when said first control voltage is below a predetermined level; and a second muting circuit which converts said second control voltage received from said control section to zero volt when said second control voltage is below said predetermined level.

9. A drive system comprising:

a control section for converting a set of given reference voltage signal and a multiplicity of logic control signals into a set of a first control voltage and a second control voltage such that the difference between said first and second control voltages represents said reference voltage signal and the polarity of said difference represents a combination of said logic control signals;

a driver for performing operations, upon receipt of said first and second control voltages from said control section, to generate a first output voltage by subtracting said second control voltage from said first control voltage and a second output voltage by subtracting said first control voltage from said second control voltage; and said drive system outputting said first and second output voltages of said driver as the outputs of the drive system.

10. The drive system according to claim 9, wherein said driver has:
- a first muting circuit which converts said first control voltage received from said control section to zero volt when said first control voltage is below a predetermined level; and
- a second muting circuit which converts said second control voltage received from said control section to zero volt when said second control voltage is below said predetermined level.

11. The drive system according to claim 9, wherein said driver is provided with:
- first voltage-current conversion means for converting the first control voltage received from the control section into a first current;
- second voltage-current conversion means for converting the second control voltage received from the control section into a second current;
- first current-voltage conversion means for converting a current which is the first current minus the second current into a first voltage; and
- second current-voltage conversion means for converting a current which is the second current minus the first current into a second voltage, to thereby perform the aforementioned operations in terms of said converted currents.

12. The drive system according to claim 11, wherein said driver has:
- a first muting circuit which converts said first control voltage received from said control section to zero volt when said first control voltage is below a predetermined level; and
- a second muting circuit which converts said second control voltage received from said control section to zero volt when said second control voltage is below said predetermined level.

13. A drive system comprising:
- a control section for converting a set of given reference voltage signal and a multiplicity of logic control signals into a set of a first control voltage and a second control voltage such that the difference between said first and second control voltages represents said reference voltage signal and the polarity of said difference represents a combination of said logic control signals;
- a driver for performing operations, upon receipt of said first and second control voltages from said control section, to generate a first output voltage by subtracting said second control voltage from said first control voltage and a second output voltage by subtracting said first control voltage from said second control voltage;
- an electric motor; and
- said drive system driving said electric motor by said first and second output voltages of said driver.

14. The drive system according to claim 13, wherein said driver has:
- a first muting circuit which converts said first control voltage received from said control section to zero volt when said first control voltage is below a predetermined level; and
- a second muting circuit which converts said second control voltage received from said control section to zero volt when said second control voltage is below said predetermined level.

15. The drive system according to claim 13, wherein said driver is provided with:
- first voltage-current conversion means for converting the first control voltage received from the control section into a first current;
- second voltage-current conversion means for converting the second control voltage received from the control section into a second current;
- first current-voltage conversion means for converting a current which is the first current minus the second current into a first voltage; and
- second current-voltage conversion means for converting a current which is the second current minus the first current into a second voltage, to thereby perform the aforementioned operations in terms of said converted currents.

16. The drive system according to claim 15, wherein said driver has:
- a first muting circuit which converts said first control voltage received from said control section to zero volt when said first control voltage is below a predetermined level; and
- a second muting circuit which converts said second control voltage received from said control section to zero volt when said second control voltage is below said predetermined level.

* * * * *